UNITED STATES PATENT OFFICE.

ROBERT WELDE, OF HÖCHST-ON-THE-MAIN, AND BENNO HOMOLKA, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

BLUE VAT DYESTUFF AND PROCESS OF MAKING SAME.

1,025,174. Specification of Letters Patent. Patented May 7, 1912.

No Drawing. Application filed January 20, 1911. Serial No. 603,653.

*To all whom it may concern:*

Be it known that we, ROBERT WELDE, Ph. D., chemist, and BENNO HOMOLKA, Ph. D., chemist, citizens of the Empire of Germany, residing at Höchst-on-the-Main and Frankfort-on-the-Main, Germany, respectively, have invented certain new and useful Improvements in Blue Vat Dyestuffs and Processes of Making Same, of which the following is a specification.

According to the statement of C. Liebermann (see "*Annalen der Chemie*" 212, 28) by moderately reducing β-oxyanthraquinone there is obtained β-oxyanthranol. The reduction may be effected either in the manner indicated by Liebermann, or by means of other reducing agents, such, for instance, as hydrosulfites. Thus, α-oxyanthraquinone (erythro-oxyanthraquinone) yields a well characterized reduction-product, to be denominated "α-oxyanthranol," of the formula:

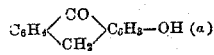

which crystallizes from alcohol in the form of yellow needles; it dissolves in alkali lyes to a yellow solution which turns red on exposure to the air with oxidation. Now, we have found that by condensing the reduction-product of α-oxyanthraquinone with an isatin substituted in alpha-position, particularly with an isatin anilid or an isatin halogenid, valuable indigoid vat dyestuffs are obtained.

Example 1: 222 parts by weight of α-isatinanilid are heated on the water bath with 210 parts of α-oxyanthranol, in about 1000 parts of acetic acid anhydrid, while stirring, until the separation of the coloring matter is completed. The dyestuff, which is a dark-blue crystalline powder resembling indigo, is filtered off, washed with acetic acid and water and dried.

Example 2: 161 parts by weight of methyl-isatin (isatin of the toluene series) are dissolved in benzene, toluene or xylene and then converted in known manner into the methylisatinchlorid by means of phosphorous pentachlorid, whereupon 210 parts of α-oxyanthranol are added and the mixture digested for some hours at a low temperature. The separated dyestuff is then treated as indicated in Example 1.

Similar dyestuffs are obtained by using the anilids or chlorids of isatins substituted in the nucleus, for instance halogen-isatins, alkyloxy-isatins or the like.

The dyestuffs obtainable by the above-described process are insoluble in water, scarcely soluble in alcohol, but readily soluble in boiling xylene, phenol, nitrobenzene or the like, to a blue to greenish-blue color. In concentrated sulfuric acid they dissolve to a violet-red solution. When treated with alkaline reducing agents, the dyestuffs form orange-yellow vats which give on the fiber pure-blue to greenish-blue tints.

Having now described our invention, what we claim is:

1. The process of making vat dyestuffs, which consists in causing an isatin substituted in alpha position to act upon α-oxyanthranol.

2. The vat dyestuffs hereinbefore described, being the condensation-products of α-oxyanthranol with an isatin substituted in alpha position, said dyestuffs being indigo-blue crystalline powders, insoluble in water, very little soluble in alcohol, readily soluble with a blue color in boiling xylene, phenol and nitrobenzene, also soluble with a violet color in concentrated sulfuric acid, and dissolving when treated with alkaline reducing agents, with an orange-yellow color.

3. The vat dyestuff hereinbefore described, being the condensation product of α-oxyanthranol with α-isatin anilid, said dyestuff being an indigo-blue crystalline powder, insoluble in water, very little soluble in alcohol, readily soluble with a blue color in boiling xylene, phenol and nitrobenzene, also soluble with a violet color in concentrated sulfuric acid, and dissolving when treated with alkaline reducing agents, with an orange-yellow color.

In testimony whereof, we affix our signatures in presence of two witnesses.

ROBERT WELDE.
BENNO HOMOLKA.

Witnesses:
JEAN GRUND,
CARL GRUND.